US008319620B2

(12) United States Patent
Usher et al.

(10) Patent No.: US 8,319,620 B2
(45) Date of Patent: Nov. 27, 2012

(54) AMBIENT SITUATION AWARENESS SYSTEM AND METHOD FOR VEHICLES

(75) Inventors: John Usher, Beer (GB); John P Keady, Boca Raton, FL (US)

(73) Assignee: Personics Holdings Inc., Boca Raton, FL (US)

( * ) Notice: Subject to any disclaimer, the term of this patent is extended or adjusted under 35 U.S.C. 154(b) by 716 days.

(21) Appl. No.: 12/487,639

(22) Filed: Jun. 18, 2009

(65) Prior Publication Data

US 2010/0033313 A1 Feb. 11, 2010

Related U.S. Application Data

(60) Provisional application No. 61/074,096, filed on Jun. 19, 2008.

(51) Int. Cl.

| | |
|---|---|
| ***B60Q 1/00*** | (2006.01) |
| ***B60R 25/10*** | (2006.01) |
| ***H04B 1/00*** | (2006.01) |
| *H04R 3/00* | (2006.01) |

(52) U.S. Cl. ................ 340/438; 340/426.26; 340/425.5; 340/566; 367/199; 381/56; 381/86; 381/122

(58) Field of Classification Search .................. 340/438, 340/426.26

See application file for complete search history.

(56) References Cited

U.S. PATENT DOCUMENTS

| | | | | |
|---|---|---|---|---|
| 5,710,555 | A | 1/1998 | McConnell et al. | |
| 5,894,279 | A * | 4/1999 | Rose et al. | 340/902 |
| 6,150,927 | A * | 11/2000 | Nesbitt | 340/426.25 |
| 6,980,125 | B1 | 12/2005 | Barber | |
| 2002/0150262 | A1 * | 10/2002 | Carter | 381/86 |
| 2003/0090377 | A1 * | 5/2003 | Pieper | 340/566 |
| 2005/0074131 | A1 | 4/2005 | McCall et al. | |
| 2006/0083388 | A1 | 4/2006 | Rothschild | |

OTHER PUBLICATIONS

U.S. Appl. No. 12/035,873, filed Feb. 22, 2008.
U.S. Appl. No. 11/966,457, filed Dec. 28, 2007.

* cited by examiner

*Primary Examiner* — Donnie Crosland
(74) *Attorney, Agent, or Firm* — RatnerPrestia

(57) ABSTRACT

Methods and devices for situation awareness facilitation for a vehicle driver are provided. A method includes receiving a first acoustic signal from outside a vehicle that the driver is in and converting the first acoustic signal into a first acoustic electronic signal; sending the first acoustic electronic signal to a processor; matching the first acoustic electronic signal by the processor to stored reference electronic signals; and sending an acoustic message associated with a matched reference electronic signal to a speaker in the cab of the vehicle.

15 Claims, 5 Drawing Sheets

AMBIENT SITUATION AWARENESS SYSTEM AND METHOD FOR VEHICLES

CROSS-REFERENCE TO RELATED APPLICATIONS

This application claims the benefit of U.S. provisional patent application No. 61/074,096 filed 19 Jun. 2008. The disclosure of which is incorporated herein by reference in its entirety.

FIELD OF THE INVENTION

The present invention relates to devices and methods for vehicle situation awareness.

BACKGROUND OF THE INVENTION

Detection of sirens is discussed by a number of works.

U.S. Pat. No. 5,710,555 describes: "A siren detection system [controlling] the lights at an intersection to direct traffic [to] permit an emergency vehicle to travel through the intersection unimpeded. The system determines the frequency of the sound emanating from a siren carried by the emergency vehicle by counting pulses that indicate the frequency of the sound, by determining the elapsed time necessary to count a selected number of pulses, and by utilizing the elapsed time and number of pulses counted to determine the frequency of sound emitted by the siren."

A similar idea is presented in U.S. Pat. No. 6,980,125: "A warning light system for a traffic intersection for alerting pedestrians and operators of passenger vehicles to the approach of an emergency vehicle. The warning light system is activated only by sounds in the range of frequencies which are emitted by the siren of an emergency vehicle. The warning light system has a warning light assembly having a control unit, and also has an audio sensor unit. The warning light assembly has a blue light and a white light, which flash alternately and repeatedly, after receipt of an audio signal by the audio sensor unit from the siren of an emergency vehicle, and processing of that signal by the control unit. The lights of the warning light assembly continuously flash until the sound emitted from the siren is no longer detectable by the audio sensor."

US patent application US 2005/0074131 A1 describes: "A sound processing system for use in an automotive vehicle of the type which includes at least one door and at least one door-lock comprises at least one sound sensor coupled to the vehicle for receiving a sound external to the vehicle, an alert generator for notifying an occupant of the vehicle when the external sound is an emergency signal, and a door control module coupled to at least one door-lock for unlocking at least one door."

The above art (except US 2005/0074131 A1) does not suggest how to alert a driver of a vehicle of the presence of an approaching siren (e.g. from an emergency vehicle); or how to alert a driver of a vehicle of the presence of a different sound generated in the vicinity of the car, such as a car horn, or any sound which could be classified with more general parameters, such as a sudden onset sound (or "acute sound").

This problem is particularly pertinent when drivers are listening to loud music or communications systems such as CB radios, or when operating their vehicle's ventilation system at high fan speeds, any of which may mask any warning sounds in the ambient environment.

US patent application US 2005/0074131 does not teach a method to determine the sound level within a vehicle, nor determine the degree of acoustic isolation of the internal vehicle cabin. The present invention adds this functionality so that the driver alert can be modified to maximize detection and intelligibility of the warning alert. Furthermore, the present invention enables the location of an external sound source (e.g. siren) to be determined by detecting the strength of the detected sound in different ambient sound microphones around the vehicle.

SUMMARY OF THE INVENTION

At least one exemplary embodiment is directed to a method to detect malfunction of a vehicle subsystem or vehicle accessory (such as a malfunctioning brake caliper on a passenger vehicle or a malfunctioning rotor blade(s) on a combine-harvester). Furthermore, the related art does not teach a method or system to detect a variety of sound characteristics. The system of the present invention is directed to detecting at least one of the following examples of "signature sounds": sirens, car horns, "impulsive" sound with a rapid onset time (or "onset rate" e.g. change in sound pressure level of greater than approximately 10 dB per second), sound with a rapid offset stopping time (e.g. greater than approximately 10 dB per second), and sound with a sudden change in tonal quality (e.g. a shift in the spectral kurtosis of a sound, or sudden change in frequency and level of spectral centroid).

At least one exemplary embodiment is directed to a vehicle situation awareness device comprising: a notification device, where the notification device is configured to emit a first signal; a microphone, where the microphone is configured to measure a second signal, where the second signal is a measurement of at least a first portion of an ambient acoustic signal; and a processor, where at least one sonic signature is identified from at least a second portion of the second signal, and where when the at least one sonic signature is identified an emit signal is sent to the notification device to emit the first signal.

BRIEF DESCRIPTION OF THE DRAWINGS

Exemplary embodiments of present invention will become more fully understood from the detailed description and the accompanying drawings, wherein.

DETAILED DESCRIPTION OF EXEMPLARY EMBODIMENTS OF THE PRESENT INVENTION

Figure 1:
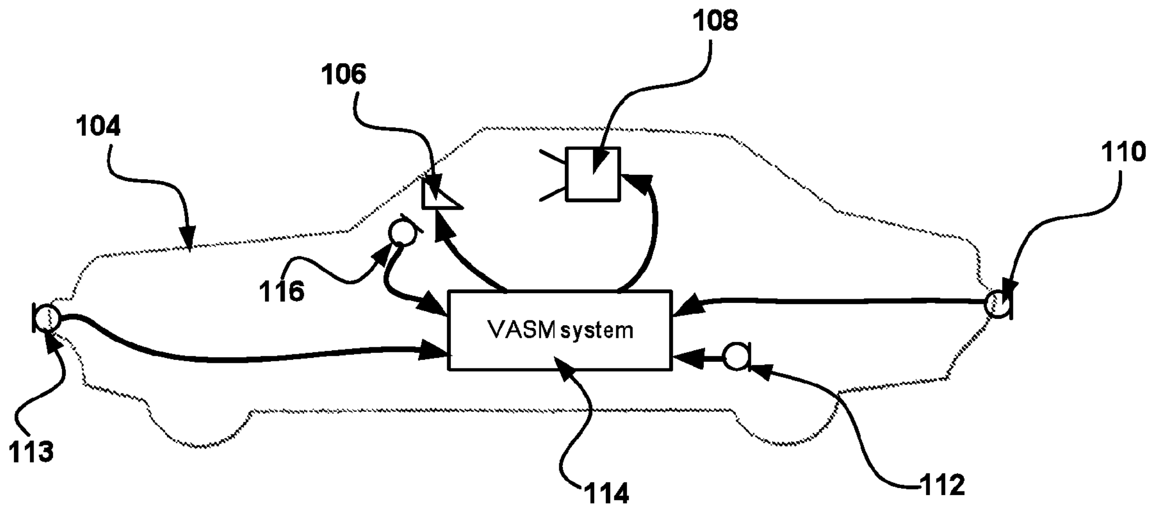
FIG. 1 illustrates a vehicle ambient sound monitoring system (VASM) in accordance with at least one exemplary embodiment.

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example specific materials may not be listed for achieving each of the targeted properties discussed, however one of ordinary skill would be able, without undo experimentation, to determine the materials needed given the enabling disclosure herein.

Additionally, exemplary embodiments can be used with digital and non-digital acoustic systems. Additionally various receivers and microphones can be used, for example MEMs transducers, diaphragm transducers, for example Knowles' FG and EG series transducers.

The following description of exemplary embodiment(s) is merely illustrative in nature and is in no way intended to limit the invention, its application, or uses.

Exemplary embodiments are directed to or can be operatively used on various vehicles, such as tractors; bulldozers; automobiles; buses; aircraft; and also motorcycle helmets.

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Notice that similar reference numerals and letters refer to similar items in the following figures, and thus once an item is defined in one figure, it may not be discussed or further defined in the following figures.

Note that various sonic signature identification methods can be used for example application Ser. Nos. 12/035,873 and 11/966,457, the disclosures of which are incorporated herein by reference in their entirety.

EXEMPLARY EMBODIMENTS

FIG. 1 illustrates an exemplary embodiment of the Vehicle ambient sound monitoring system (VASM). In this configuration, at least one Ambient Sound Microphone (ASM) 110 112, 113 are mounted on the exterior of the vehicle 104 and configured to detect sound around the vehicle 104. These microphones can be highly directional, using passive acoustic beam-forming technology (such as "shot-gun" microphones, familiar to those skilled in the art), or alternatively may use active beam-forming techniques using an array of at least three microphones. This enables the direction (or bearing) of a sound source to be determined. The microphones can be transducer microphones such as Knowles MR series weather proof microphones, WP series, TP series, FB series, and other series microphones or other acoustic energy pickup devices.

Figure 2:
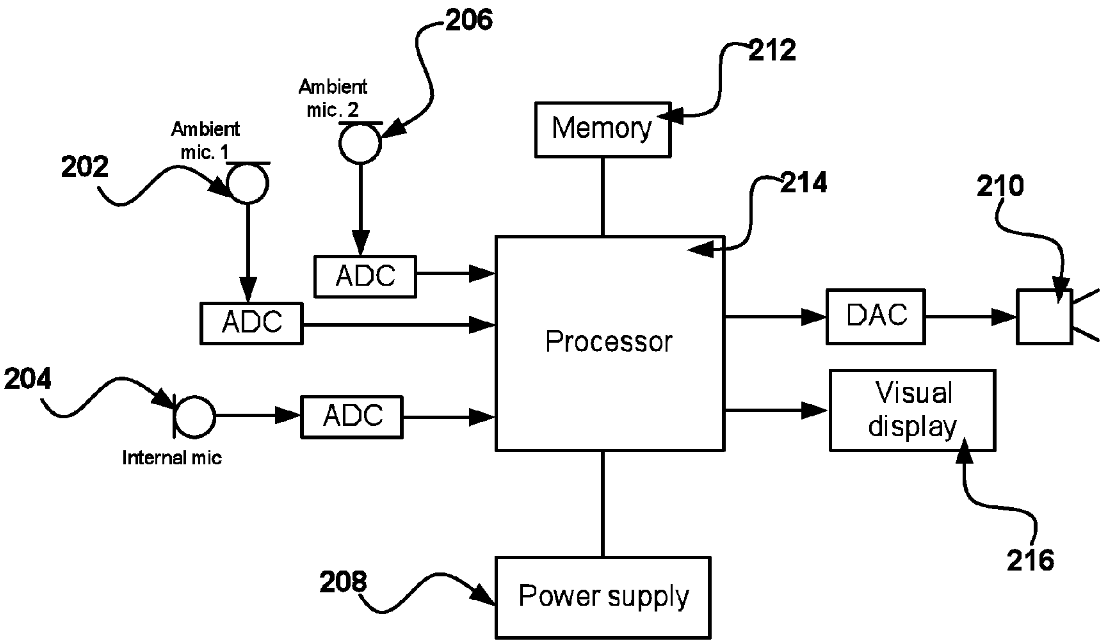
FIG. 2 illustrates an example of at least one VASM in accordance with at least one exemplary embodiment.

At least one exemplary embodiment of the VASM system 114 comprises the hardware components depicted in FIG. 2. The VASM detects "signature sounds" with the ASMs 110, 112 (e.g., 202, 206). Examples of "signature sounds" are: —sirens; —car horns; —"impulsive" sound with a rapid onset time (or "onset rate" e.g. change in sound pressure level of greater than approximately 10 dB per second); —sound with a rapid offset stopping time (e.g. greater than 10 dB per second); —sound with a sudden change in tonal quality (e.g. a shift in the spectral kurtosis of a sound, as described in FIG. 4); —sound with a rapid slewing (escalation/de-escalation) in frequency, as exemplified by the wail setting on U.S. sirens; —motorcycle engines.

The VASM compares at least one predetermined feature with at least one measured feature of at least one ASM signal. When the measured ASM sound characteristic substantially matches (e.g., within +/−5% of the FFT spectrum with a time increment dt) the at least one predetermined feature, for example the VASM system can notify the vehicle driver using at least one of the following non-limiting exemplary alerts: —a visual alert using visual display 106, e.g. a flashing light or text message, which in one exemplary embodiment is projected on to the windscreen of the vehicle, on to a combiner glass on the upper dashboard, or on to the visor panel of a helmet (i.e., a "head-up" display; —a haptic alert (tactile display) which imparts a distinct, readily detectable high-frequency vibration to the body of the driver, via one or more vibro-tactile transducers mounted in the seat pan or back, within the steering wheel rim, on the foot pedals, or in the internal cushioning or chin strap of a motorcycle helmet; —a sound alert (i.e. "auditory display") using an internal loudspeaker 108 to generate a sound in the vehicle cabin; or in another exemplary embodiment, the sound alert may be reproduced to the vehicle driver using an earphone device. In one exemplary embodiment, the alert is a reproduction of the ASM microphone signal that is used to detect the signature sound. In another embodiment, the auditory alert is a pre-recorded voice or non-voice message.

In one exemplary embodiment of the present invention, at least two loudspeakers are used, each being positioned to bias its output to one ear or the other, and the level and/or phasing of the alert signal that is sent to each loudspeaker is automatically adjusted by the VASM to facilitate the localization of the sound source in the ambient environment using spatial sound cues (in one exemplary embodiment, the alert signal may also have a different relative phase in each loudspeaker).

The internal microphone sensor 116 is configured to detect the sound pressure level (SPL) in decibels and (optionally) the sound spectral profile within the vehicle cabin (or helmet). If the internal cabin SPL is equal to or greater than a predetermined threshold (which in one exemplary embodiment is approximately 80 dB), then the reproduction SPL level of the sound alert, i.e., the "signal," is increased so that it is reproduced at a level greater than the interior cabin SPL, i.e., the "noise," by a predetermined signal-to-noise ratio to insure reliable and rapid detection by the driver. It will be obvious to one having ordinary skill in the art that the signal-to-noise ratio can be adjusted to accommodate particular vehicles and particular hearing abilities of individual drivers.

In yet another exemplary embodiment of the invention, the degree of acoustic isolation of the internal vehicle cabin (or helmet) is determined using at least one internal microphone 116 and at least one ambient microphone 112. The acoustic isolation is determined by analyzing the electronic cross correlation, or alternatively the coherence, between the at least one internal microphone and the at least one ambient microphone. If the absolute correlation or coherence is less than a predetermined threshold, then the cabin is determined to be acoustically isolated. Other methods to determined the degree of acoustic isolation of the interior vehicle cabin may also be used, such as detecting the status of the vehicle windows, doors, and ventilation system, and comparing this status with a predetermined database, e.g. if all windows, doors, and ventilation vents are closed, then the acoustic isolation status may be set to "high", or a corresponding numerical value (e.g. 20 dB).

FIG. 2 depicts an exemplary hardware assembly for the present VASM invention. The assembly comprises the following components: at least one ASM 202, 206, a signal of which is converted to a digital signal via the Analog to Digital Converter (ADC) units; at least one internal microphone 204 to detect sound on the inside of the vehicle (or motorcycle helmet); a signal processing unit 214; computer readable memory 212; power supply 208; visual display unit 216; and at least one internal loudspeaker unit 210, which receives an analog signal that has been converted via a Digital to Analog Converter (DAC).

Figure 3:
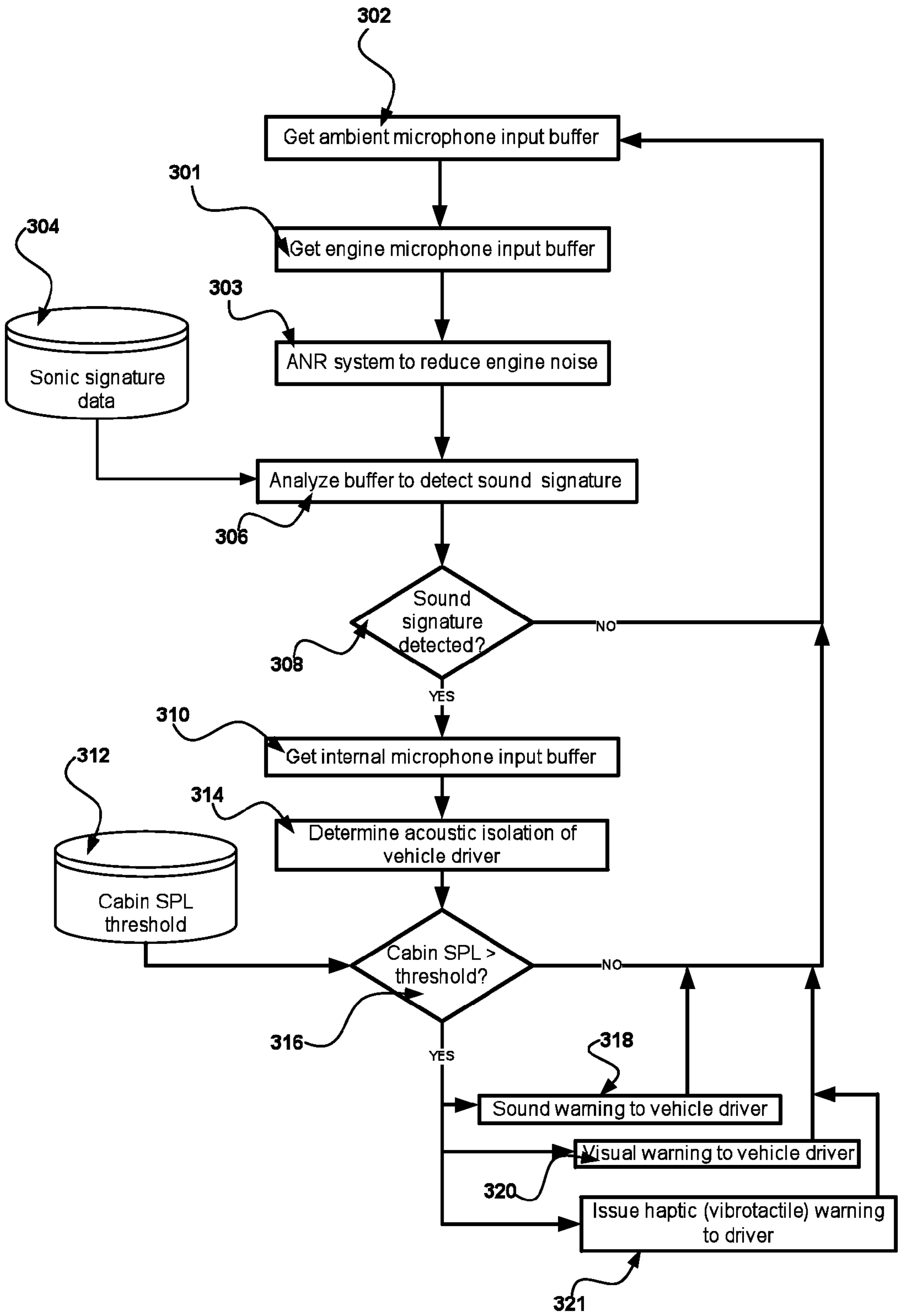
FIG. 3 illustrates at least one exemplary embodiment of the present VASM invention depicting a method to inform the vehicle driver of a detected sound signature in the ambient environment.

FIG. 3 depicts an exemplary embodiment of the present VASM invention depicting a method to inform the vehicle driver of a detected sound signature in the ambient environment.

The method comprises the following steps: accumulating an input ASM buffer of digital audio samples representing the signal from at least one ASM, step 302. At step 303, OPTIONALLY reducing the level of the vehicle engine noise; wind-noise (i.e. air turbulence generated by the car and microphone); chassis-propagation noise (noise generated by tire friction and suspension emissions) in the ASM using an Active Noise Reduction (ANR) system. Step 303 is described in FIG. 4. In this example embodiment, the ANR subtracts a filtered and time-shifted reference signal (which in one exemplary embodiment, is a signal from a microphone near the vehicle engine, at step 301), from the ASM signal (step 302). Such ANR systems are familiar to those skilled in the art. In one exemplary embodiment, the filter is an adaptive filter updated according to the Least Means Square (LMS) algorithm. The method includes analyzing the input ASM buffer to generate a set of ASM signal characteristics (step 306), and comparing the set of ASM signal characteristics with a predetermined set of characteristics 304 to detect a sound signature if the sets of signal characteristics are substantially similar. The method also includes determining if a sound signature is detected with a logic unit at step 308, and if it is not, the process is repeated at step 302. The method of detection can use the GMM approach, familiar to those skilled in the art. Alternatively, the method of detection can use the rate of change of the ASM (or modified ASM) signal envelope to detect sudden onsets or offsets. If a sound signature is detected at step 308, then the SPL in the interior cabin of the vehicle is determined at step 314 using an internal microphone input buffer at step 310. If, at step 316, the SPL of the interior cabin of the vehicle is greater than a predetermined threshold 312, AND a sound signature has been detected, then at least one of three alerts are issued: a.) An audible warning 318; b.) A visual warning 320; and c.) A haptic (vibrotactile) warning 321. The vibrotactile mode can be very effective in conveying the locale of a target signal if multiple vibrotactors are used, e.g., one under the front of the thigh in the seat pan cushion (signaling an approach from front), two in the seat back cushion (approach from the back; left right directionality, etc.). Furthermore, vibrotactors provide a great opportunity for conveying a speed of approach of the oncoming siren, with the use of a single transducer, by increasing the frequency and/or amplitude of the vibration to coincide with the increasing speed or "closing of the gap" of an approaching emergency vehicle.

An audible warning can be presented to the driver using at least one loudspeaker in the vehicle cabin, or using earphone devices within a helmet. The direction of the ambient sound, which triggered the warning can be determined using an array of at least two ASMs mounted on the vehicle, and using active beam-forming techniques, familiar to those skilled in the art, to determine the dominant direction of the sound source. Alternatively, as already mentioned, highly directional ASM microphones (such as "shot-gun" microphones) can be used, and the corresponding direction of the ASM that detected the sound signature with the highest degree of certainty can be used to ascertain the source direction.

Figure 5:
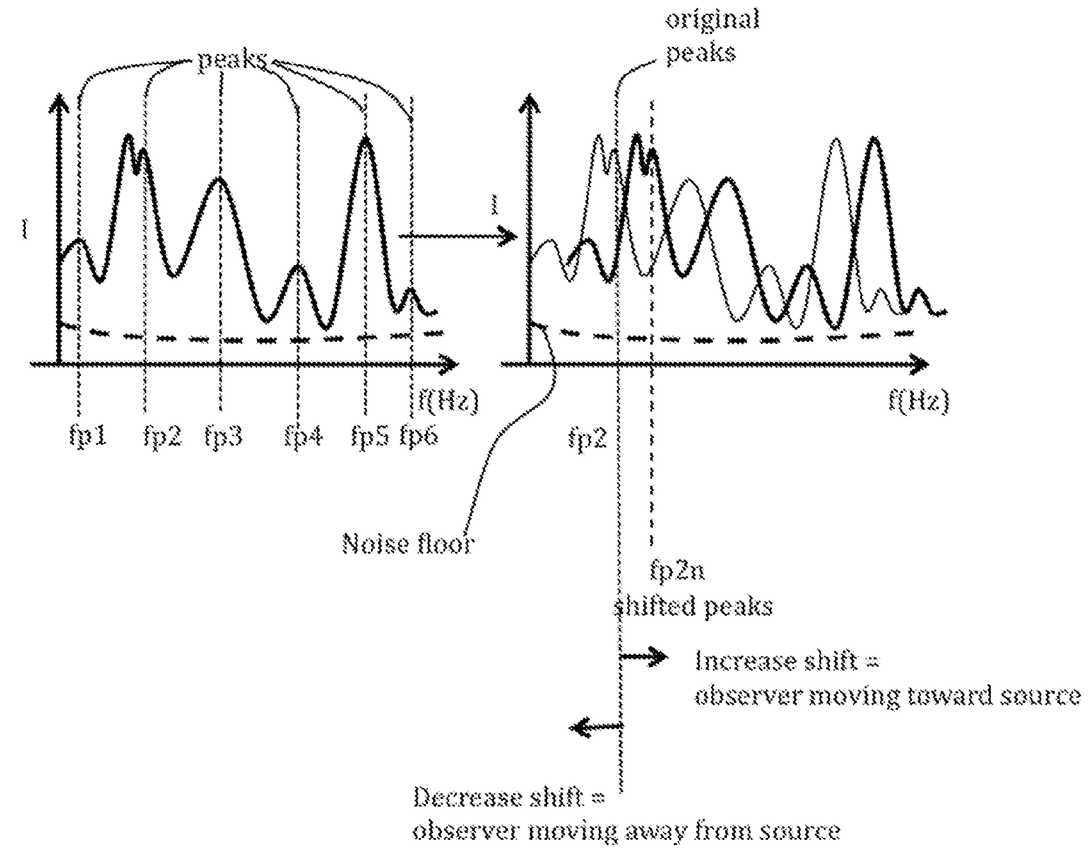
FIG. 5 illustrates the spectrum Doppler shift of an identified sonic signature spectrum.

Doppler sound cues can be used to determine a speed and a bearing of approaching vehicles. The Doppler shift rate (in Hz/second) can be estimated by the rate of change of a strong spectral feature. Once a sonic signature has been identified, key frequency dependencies can be used to obtain a shift in the characteristic spectrum. For example FIG. 5 illustrates a stored frequency spectrum of a particular sonic signature in a chosen time frame (e.g., 100 msec) with peak frequencies fp1 to fp6 for a stationary source (vs=0) and a stationary vehicle (vo=0). A particular sonic signature can have the key frequency spectrum shifted due to motion of the sound source (vs < >0) and/or due to motion of the vehicle (vo< >0). A frequency shift can be described as fp2*n*=fp2((v+/−vo)/(v−/+vs)), where the upper sign is used if the source/vehicle move toward each other and the lower sign applies if they are moving apart. If the vehicle motion is isolated using motion devices (e.g., accelerometers, GPS) then vo can be measured by these devices (e.g., vox, voy, voz, in the respective three directions), and if v (speed of sound) is known, then vs can be determined after determining the frequency shift from the spectrums.

When the vehicle is parked or reversing, the ASM signals are reproduced to the internal cabin via the cabin loudspeakers. In one exemplary embodiment, the reproduced ASM signals are first processed with the ANR system described (to remove masking noise) as in FIG. 4, thus increasing the situation awareness of the vehicle occupants for local sound sources, such as a child behind the car. In one exemplary configuration, when the car is reversing only the rear ASM signals (e.g. those on the rear bumper) are reproduced, and the spatial cues of the ambient environment can be preserved within the vehicle cabin by reproducing the rear-left ASM signal with the rear-left loudspeaker in the vehicle, and the rear-right ASM signal with the rear-right loudspeaker.

Figure 4:
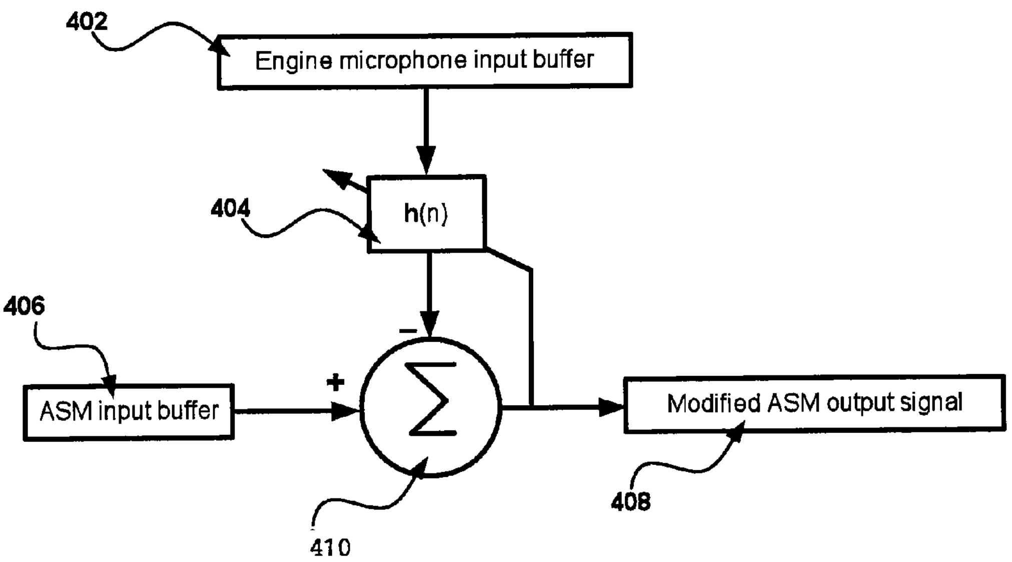
FIG. 4 illustrates an exemplary embodiment of the Active Noise Reduction (ANR) system.

FIG. 4 describes an exemplary embodiment of the Active Noise Reduction (ANR) system 303. In one exemplary embodiment, the engine microphone input buffer 402 is a first input signal from a microphone close to or directly coupled with the vehicle engine. In another exemplary embodiment, this input signal 402 is a signal that has been stored on computer readable memory or automatically generated. The first input signal 402 is filtered by a frequency dependant adaptive filter 404, with filter coefficients h(n), to produced a filtered signal, where:

$$h(n)=[h_0,h._1 \ldots h._n].$$

The filtered signal is then subtracted from the ASM input buffer 406 via subtractor 410, which in one exemplary embodiment is the signal from one ASM microphone located on the bumper of the vehicle. The resulting modified ASM output signal 408 is then used for the sound signature identification system. The modified ASM output signal 408 is also used to update the adaptive filter coefficients h(n), which in one exemplary embodiment is updated using the LMS algorithm:

$$\hat{h}(n+1)=\hat{h}(n)+\mu x(n)e^*(n)$$

Where x(n) is a vector of the samples of the engine microphone input buffer 402; e(n) is a single output sample of the modified ASM output signal 408; and μ is a step size update coefficient.

At least one exemplary embodiment is directed to localization of the sound source, using either the visual indicator or a multi-channel loudspeaker audio system in the vehicle. Localization can be ascertained in terms of an azimuthal bearing of an ambient sound source. Furthermore, a velocity of an ambient sound source can be reported to the user with Doppler cues.

The active pass-through of the ASM signal to internal loudspeakers, via the ANR system may be used, to increase situational awareness of the vehicle occupants to local sound sources, such as a human who may be obscured from view behind the vehicle.

An ANR system may be used to reduce the engine, chassis, wind or other noise in the ASM signals.

None of the cited art teach a method to detect malfunction of a vehicle engine or vehicle accessory (such as a malfunctioning rotor blade(s) on a combine-harvester).

Furthermore, the related art does not teach a method or system to detect a variety of sound characteristics. The system of the present invention is directed to detecting at least one of the following examples of "signature sounds": —sirens; —car horns; —"impulsive" sound with a rapid onset time (or "onset rate" e.g. change in sound pressure level of greater than approximately 10 dB per second); —sound with a rapid offset stopping time (e.g. greater than 10 dB per second); —sound with a sudden change in tonal quality (e.g. a shift in the spectral kurtosis of a sound, as described in FIG. 4); —sound with a rapid slewing (escalation/de-escalation) in frequency, as exemplified by the wail setting on U.S. sirens; —motorcycle engines. The method of detection can use the GMM approach, familiar to those skilled in the art. Alternatively, the method of detection can use the rate of change of the ASM (or modified ASM) signal envelope to detect sudden onsets or offsets. In addition, in at least one exemplary embodiment the method of alerting the vehicle user is modified by the user's ambient sound level (i.e. the sound level of the internal vehicle cabin, or the sound level within the helmet).

At least one exemplary embodiment is directed to a vehicle situation awareness device comprising: a notification device, where the notification device is configured to emit a first signal; a microphone, where the microphone is configured to measure a second signal, where the second signal is a measurement of at least a first portion of an ambient acoustic signal; and a processor, where at least one sonic signature is identified from at least a second portion of the second signal, and where when the at least one sonic signature is identified an emit signal is sent to the notification device to emit the first signal.

The notification device can be a speaker (receiver) in the vehicle passenger compartment. For example if a sonic signature is identified and information is available to determine whether it is coming toward the vehicle, an audio signal can be emitted from the speaker (receiver) identifying the source and that the source is approaching the vehicle and from which direction and at which rate. Additionally the notification device can be a display (e.g., lights, a heads up display, video). For example if an ambulance is identified a visual display in the instrument panel can identify the location and whether it is approaching (e.g., light for location about a car outline, and red for approaching and green for moving away).

In at least one exemplary embodiment the notification device is inside the vehicle. For example a speaker in the vehicle cabin, as well as outside (external speaker). In at least one exemplary embodiment the first signal can be an electronic signal sent to the notification device, which in turn then emits an acoustic signal, thus either the electronic signal or acoustic signal can be referred to as an audio signal.

At least one exemplary embodiment monitors the vehicle's systems (e.g., engines, brakes, window breakage). A microphone can be placed strategically where an acoustic signal can be sampled for sonic signatures, which identify vehicle performance. For example a normal operating engine can be acoustically signatured (sonic signature model trained to identify a correctly operating engine) then monitored to look for abnormalities in the engine performance. For example a microphone, where the microphone is configured to measure a second signal (e.g., acoustic signal in the engine compartment) where the second signal is a measurement of at least a first portion of a vehicle equipment signal (e.g., the engine acoustic signal). A processor can be used to analyze at least a second portion (e.g., time segment) of the second signal, to identify at least one sonic signature (e.g., non normal engine performance). For example the system can continuously sample for normal performance and upon the lack of detection over a predetermined amount of time (e.g., 1 minute), a warning signal (e.g., emit signal) can be sent to the notification device.

Note that in at least one exemplary embodiment the notification device can also be a video display, for example a heads up display, an LCD display, an outline of the vehicle with lights around the outline so as to identify detection location, colored labeled lights to identify as well as other visual notification systems as known by one of ordinary skill in the art of notification.

At least one exemplary embodiment can use a second processor that takes an emit signal (e.g., engine error signal) and send a control signal to the vehicle control system (e.g., engine processor) to modify system operation (e.g., vary fuel/air mixture). Many aspects of the vehicle can be controlled in response to an emit signal, for example shifting gears, decreasing power usage, sending a remote signal, operating the windshield wiper, and changing the headlight illumination.

At least one exemplary embodiment can include a microphone, where the microphone is configured to measure an interior vehicle acoustic signal or an external vehicle acoustic signal where a portion of the measured acoustic signal is used to identify sonic signatures and depending upon the sonic signature an action is taken (e.g., abnormal tire sound, an action to send a warning to the driver) or not taken (e.g., sonic signature is a normal tire operation, then no action is taken).

In at least one exemplary embodiment the sonic signature is a voice command. For example a user can store his command "open", where if the sonic signature "open" is identified a command is sent to a processor to open the vehicle doors. Similar commands such as "open gas tank", "open door", "start", "alarm", and other such commands can be used to control the vehicle. At least one further exemplary embodiment to modify vehicle operation includes one of at least opening a door, opening the trunk, opening the gas tank access panel, opening the hood, turning on the headlights, turning on an audio alarm, and beginning audio recording.

At least one exemplary embodiment is directed to a method of situation awareness facilitation for a vehicle driver comprising: receiving a first acoustic signal from outside a vehicle that the driver is in and converting the first acoustic signal into a first acoustic electronic signal; sending the first acoustic electronic signal to a processor; matching the first acoustic electronic signal by the processor to stored reference electronic signals; and sending an acoustic message associated with a matched reference electronic signal to a speaker in the cabin of the vehicle.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. For example, if words such as "orthogonal", "perpendicular" are used the intended meaning is "substantially orthogonal" and "substantially perpendicular" respectively. Additionally although specific numbers may be quoted in the claims, it is intended that a number close to the one stated is also within the intended scope, i.e. any stated number (e.g., 20 mils) should be interpreted to be "about" the value of the stated number (e.g., about 20 mils).

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. A vehicle situation awareness device for a vehicle comprising:
- a notification device in the vehicle configured to emit an audio signal;
- an internal microphone configured to measure an internal acoustic signal in the vehicle;
- an ambient microphone configured to measure an ambient acoustic signal external to the vehicle; and
- a processor configured to:
  - determine an internal sound pressure level (SPL) in the vehicle based on the internal acoustic signal,
  - identify at least one sonic signature from the ambient acoustic signal, and
  - when the at least one sonic signature is identified, determine whether to send an emit signal to the notification device to emit the audio signal based on the internal SPL.

2. The awareness device according to claim 1, where the notification device includes a receiver.

3. The awareness device according to claim 1, where the notification device further includes a video display.

4. The awareness device according to claim 1, where the audio signal includes at least one of the ambient acoustic signal, a voice message or a non-voice message.

5. The awareness device according to claim 1, where the processor adjusts a reproduction SPL of the audio signal based on the internal SPL.

6. A vehicle situation awareness device for a vehicle comprising:
- a notification device in the vehicle configured to emit an alert signal including an audio signal;
- an internal microphone configured to measure an internal acoustic signal in the vehicle;
- an external microphone configured to measure a vehicle equipment signal; and
- a processor configured to:
  - determine an internal sound pressure level (SPL) in the vehicle based on the internal acoustic signal,
  - identify at least one sonic signature from the vehicle equipment signal, and
  - when the at least one sonic signature is identified, determine whether to send an emit signal to the notification device to emit the audio signal based on the internal SPL.

7. The awareness device according to claim 6, where the notification device includes a receiver.

8. The awareness device according to claim 6, where the notification device includes a video display.

9. The awareness device according to claim 6, where the alert signal is an input to a second processor, the alert signal used by the second processor to affect an operation of the vehicle.

10. The awareness device according to claim 9, where the operation is at least one of shifting gears, decreasing power usage, sending a remote signal, operating a windshield wiper, and changing a headlight illumination.

11. A vehicle situation awareness device for a vehicle comprising:
- a notification device in the vehicle configured to emit an alert signal to a first processor, the first processor used to modify an operation of the vehicle responsive to the alert signal;
- an internal microphone configured to measure an interior vehicle acoustic signal in the vehicle;
- an external microphone configured to measure an external vehicle acoustic signal; and
- a second processor, configured to:
  - determine an interior sound pressure level (SPL) in the vehicle based on the interior vehicle acoustic signal;
  - identify at least one sonic signature from at least one of the interior vehicle acoustic signal or the external vehicle acoustic signal, and
  - when the at least one sonic signature is identified, determine whether to send an emit signal to the notification device to emit the alert signal based on the interior SPL.

12. The awareness device according to claim 11, where the at least one sonic signature is a vocal command.

13. The awareness device according to claim 12, where the alert signal uniquely corresponds to the voice command.

14. The awareness device according to claim 11, where the operation includes one of at least opening a door, opening a trunk, opening a gas tank access panel, opening the hood, turning on headlights, turning on an audio alarm, and beginning an audio recording.

15. A method of situation awareness facilitation for a vehicle driver of a vehicle, the method comprising:
- receiving an internal acoustic signal from inside the vehicle and converting the internal acoustic signal to an internal acoustic electronic signal;
- receiving an ambient acoustic signal from outside the vehicle and converting the ambient acoustic signal into an ambient acoustic electronic signal;
- determining, by a processor, an internal sound pressure level (SPL) in the vehicle based on the internal acoustic electronic signal;
- matching, by the processor, the ambient acoustic electronic signal to one or more stored reference electronic signals; and
- determining whether to send an acoustic message associated with a matched reference electronic signal to a speaker in the vehicle based on the internal SPL.

* * * * *